United States Patent
Weiss et al.

(10) Patent No.: US 7,069,418 B2
(45) Date of Patent: Jun. 27, 2006

(54) METHOD AND ARRANGEMENT FOR INSTRUCTION WORD GENERATION IN THE CONTROLLING OF FUNCTIONAL UNITS IN A PROCESSOR

(75) Inventors: Matthias Weiss, Dresden (DE); Gerhard Fettweis, Dresden (DE)

(73) Assignee: Systemonic AG, Dresden (DE)

( * ) Notice: Subject to any disclaimer, the term of this patent is extended or adjusted under 35 U.S.C. 154(b) by 381 days.

(21) Appl. No.: 10/075,916

(22) Filed: Feb. 14, 2002

(65) Prior Publication Data

US 2002/0194454 A1    Dec. 19, 2002

(30) Foreign Application Priority Data

Feb. 14, 2001   (DE) ............................... 101 07 107

(51) Int. Cl.
*G06F 9/44*  (2006.01)

(52) U.S. Cl. ........................................ 712/24; 712/227
(58) Field of Classification Search .................. 712/24, 712/227, 200, 23; 341/173
See application file for complete search history.

(56) References Cited

U.S. PATENT DOCUMENTS

| | | | |
|---|---|---|---|
| 5,079,693 A * | 1/1992 | Miller ......................... | 711/156 |
| 5,267,191 A * | 11/1993 | Simpson ...................... | 365/78 |
| 5,347,638 A * | 9/1994 | Desai et al. .................... | 710/5 |
| 5,953,747 A | 9/1999 | Steely, Jr. et al. .......... | 711/204 |
| 6,745,265 B1 * | 6/2004 | Sindalovsky ................. | 710/57 |

FOREIGN PATENT DOCUMENTS

DE    19859389    7/2000

* cited by examiner

*Primary Examiner*—Henry W. H. Tsai
(74) *Attorney, Agent, or Firm*—Baker Botts L.L.P.

(57) ABSTRACT

The invention relates to a method and an arrangement for instruction word generation in the controlling of functional units in a processor, the instruction words comprising a plurality of instruction word parts. In this case, in a program sequence, under the control of a program word, an instruction word is taken from a row—determined by a reading row number—of an instruction word memory that can be written to row by row, the said instruction word is altered by means of substitution of an instruction word part by the information part of the respective program word and is written back to a row of the instruction word memory, the said row being determined by a writing row number. Afterwards, an instruction word—which is generated in this way and is to be executed in accordance with the program—for controlling the functional units is output to the processor.

According to the invention, a reduction in the processing width and an increase in the operating speed is achieved by the writing and reading row numbers being generated by corresponding registers and/or the largest possible number of instruction words that are to be executed being successively compiled in the instruction word memory and processed, so that they are combined in blocks. This makes it possible to reduce the processing width during the program word processing in the part which carries control information.

8 Claims, 2 Drawing Sheets

METHOD AND ARRANGEMENT FOR INSTRUCTION WORD GENERATION IN THE CONTROLLING OF FUNCTIONAL UNITS IN A PROCESSOR

BACKGROUND OF THE INVENTION

The invention relates to a method for the generation of instruction words for driving functional units in a processor, the instruction words comprising a plurality of instruction word parts. Each instruction word part respectively controls a functional unit. A sequence of primary instruction words, which originate from a translation of a program code, undergoes fractionation into program words of a program sequence. During the program sequence, under the control of a program word which has an information part at least of the width of an instruction word part, an instruction word is taken from a row—determined by a reading row number—of an instruction word memory that can be written to row by row and is altered by means of substitution of an instruction word part with the information part of the respective program word. It is then written back to a row of the instruction word memory, the said row being determined by a writing row number. After generation—effected in this way—of an instruction word corresponding to the primary instruction word to be executed, the instruction word is provided to an output for driving the functional units.

The invention furthermore relates to an arrangement for carrying out the above method.

The German Patent Specification DE 198 59 389 C1 describes an arrangement for controlling functional units in a processor. As discussed therein, the program word contains, in addition to an information part, at least also the information about the writing and reading row numbers for the instruction word memory. This necessitates a large width of the program words which, on the one hand, with the requisite processing and decoding of the control information, produce limitations in the processing speed of the task-related data. On the other hand, the high data width of the program word processing necessitates high outlay on hardware in the realization of the processor.

It is an object of the invention to reduce the data width of the program word to be processed in order that the outlay on hardware and thus the costs for the realization of the processor are kept low.

SUMMARY OF THE INVENTION

According to the invention the required reading/writing control information for the instruction word memory is provided by a read pointer register, which has stored the reading row number, and by a write pointer register, which has stored the writing row number, for program word processing.

It is expedient that the largest possible number of instruction words that are to be executed are successively compiled and stored in the instruction word memory, so that they are combined in blocks. Thus, it is possible to set the read pointer register and the write pointer register with the number of successive reading and writing row numbers in a ring counting mode. This number is provided by the content of a block length register.

In a particular refinement of the method according to the invention, the program word has a set bit which, in a set active state, interrupts the instruction word generation and causes transfer of the information part of the program word to the read pointer register, and/or the write pointer register and/or the block length register and, in a set inactive state, the generation of instruction words is carried out.

What is realized with this solution is that the required information for the read pointer register and the write pointer register and the block length register for the execution of a further block of instruction words is identified, decoded and not processed further. As a result, these registers can be preset.

What can thus be achieved is that in each case the row of the instruction word memory for the generation of the instruction word corresponding to the primary instruction word is addressed by the program word sequence which contains an instruction word which must undergo the least changes.

Writing that is more favorable for the further instruction word sequence can also be chosen. By way of example, if a plurality of program words are required for the generation of the instruction word corresponding to the primary instruction word, that is to say a plurality of intermediate steps are required, it may be expedient, in the case of each intermediate step, to read from the same row and to write to the same row again. The read pointer register and the write pointer register are thus stopped, which can be determined by the register settings.

Afterwards, it may be expedient, with a specific repetition rate, to allow the writing row and reading row numbers to descend or ascend, beginning from a specific number in each case. That, too, can be realized with a renewed setting of the registers. In a supplementary refinement of the method according to the invention, it is provided that in the case of a program word with a set active state of the set bit, the content of the information part of the program word is stored in the read pointer register, the write pointer register and block length register.

An advantageous embodiment of the method according to the invention provides for the instruction word memory to be divided into a first instruction word memory page and into a second instruction word memory page each having the same row numbering, and for the synthesis of the instruction word, the instruction word memory page to be called to be determined by the content of a page register.

In this refinement, the different groupings of the instruction word memory, the instruction word memory pages, are addressed by the content of the page register. In these instruction word memory pages the row addressing is performed with synchronous read register pointer and write register pointer.

Thus, instruction words are set up blockwise in the respective instruction word memory pages and executed, the selection of which is performed only by the indication of the page memory content provided with a smaller bit width and not by means of the addressing of the start values of read pointer and write pointer, for which larger bit widths are necessary.

It is also possible, even in the case of a configuration in which the writing and reading row numbers are contained in the program words, to achieve a reduction in the width of the program words, since, in the case of a large number of rows in the instruction word memory, page division enables the row numbers to be kept smaller and thus the corresponding information in the program word to be kept narrower.

In a further advantageous embodiment of the methods according to the invention, it is provided that an interrupt signal immediately triggers, at the processor, while processing a first task using one instruction word memory page, the execution of the interrupt second task on the other instruction word memory memory page whereby after the completion of the interrupted second task, processing of the first task can be resumed using the processing state of the said first task in the one instruction word memory page.

This solution according to the invention ensures that tasks of higher priority, which the processor must execute quickly, are advantageously incorporated into the entire execution of the program word processing without a time delay and with an extremely low outlay on buffer-storage and addressing.

In a further refinement of the methods according to the invention, it is provided that a prefetch unit controls the set-up of the instruction word memory, and that, independently of the processing state of the current task, the prefetch unit provides an additional instruction word in an unused row of the instruction word memory if no new instruction word is obtained during the execution of a current task.

This solution ensures that, during the execution of the instruction words, delays in the provision of new instruction words are minimized in that, in waiting times for storing a new instruction word in the instruction word memory, this time is used by the prefetch unit in order to process a program word that is subsequently present for processing and to provide a newly generated instruction word in a separate area of the instruction word memory for instruction word processing.

One refinement of the arrangement according to the invention provides for the instruction word memory to be provided with a generation unit having a block length register, a read pointer register and a write pointer register. The read pointer register is associated with a read pointer up/down counter and the write pointer register is associated with a write pointer up/down counter, the modulo counting properties of the up/down counters are determined by the content of the block length register.

The invention will be explained in more detail below using an exemplary embodiment.

DESCRIPTION OF THE INVENTION

Figure 1:
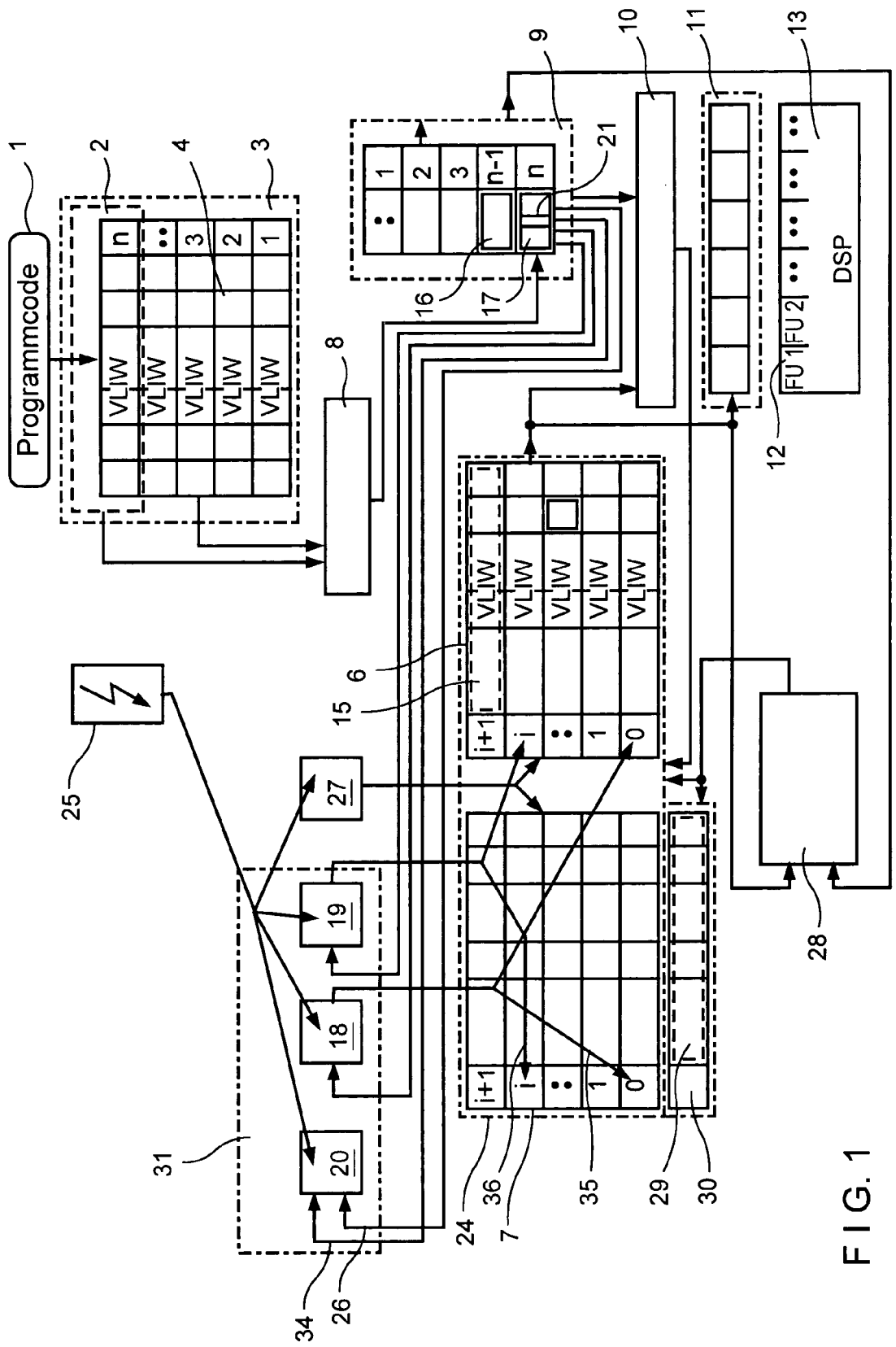
FIG. 1 illustrates functional blocks of an instruction word generator.

FIG. 1 shows an arrangement for practice of instruction word generation in the driving of functional units 12 of a processor 13 according to a preferred embodiment of the invention. A sequence of primary instruction words 2, comprising a plurality of instruction word parts 4 is generated in a known manner from a program code 1 by means of translation before a program sequence. Furthermore, the sequence of primary instruction words 2 is fractionated in the program word generation unit 8 and stored as a sequence of associated program words 17 in a sequence memory 9.

In a program sequence, before outputting from the sequence memory 9, the program word 17 having a set bit 21 contained therein is checked for an active state. If such a state is identified, the further program word processing in the instruction word generation processor 10 is interrupted and the information part of this program word 17 is written to a read pointer register 18, a write pointer register 19 and a block length register 20.

With these items of information newly written in the register contents the modulo counting mode of the read pointer register 18 and of the write pointer register 19 is set with the content of the block length register 20. The respective start values of the read pointer 35 and write pointer 36 that are to be output during the next instruction word processing are preset with the contents of the read pointer register 18 and of the write pointer register 19.

During the subsequent instruction word processing in an instruction word memory 24 preferably having first and second instruction word memory page 6, 7, one of which is selected by the content of the page register 27, the output read pointer 35 specifies the current reading row number and the output write pointer 36 specifies the current writing row number of a block of instruction words which is to be processed, and which is provided with the block length determined by the content of the block length register 20. The instruction word processing step can be executed in accordance with the program by means of read/write/NOP (no-operation) operations, connected with a required outputting operation into the instruction word output 11.

After an instruction word processing step, the read pointer register 18 and the write pointer register 19 are advanced by one and a further instruction word processing step can be effected.

If an interrupt signal 25 is triggered by the processor 13, an associated task with higher priority must be executed immediately. All of the previous register contents including those of the page register are buffer-stored and these registers are occupied anew during the interrupt operation. The instruction word processing associated with the interrupt is executed in an instruction word memory 24 provided therefor. After the end of the interrupt operation, all the buffer-stored register contents are restored and the instruction word processing can be continued in accordance with the program at the point interrupted by the interrupt signal 25.

Where there are two pages of the instruction word memory, the original task can be executed in a first page and the interrupt task executed in a second page.

If, during an instruction word processing, no new instruction word 15 is requested by the instruction word generation processor 10 for storage in the instruction word memory 24, the program word successor 16 from the sequence memory 9 and the instruction word 15 currently output by the instruction word memory 24 are read in by the prefetch unit 28 and the additional instruction word 29 is generated. The latter is provided in a free row of the instruction word memory 24 or in the additional instruction word memory 30, and is immediately reloaded in the event of a request for a new instruction word 15 that is effected in the further course of the instruction word processing. The delay during the provision of the new instruction word 15 in the instruction word generation processor 10, caused by the processing time arising there, is avoided in this way.

The functions required for processing in the corresponding functional units 12 of the processor 13 are triggered with storage of the instruction word 15 in the instruction word output 11.

Figure 2:
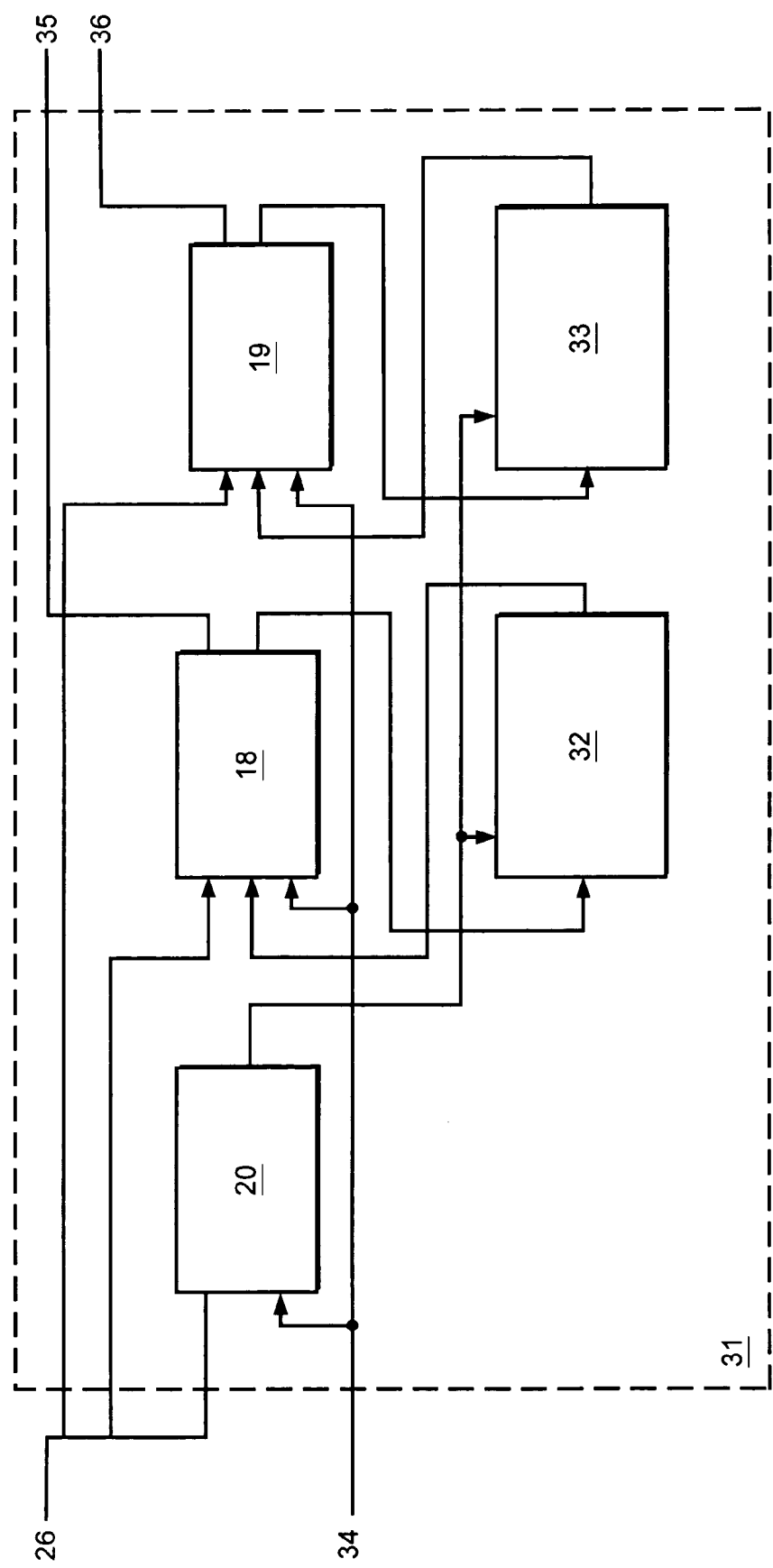
FIG. 2 is a block diagram of the generation unit.

FIG. 2 reveals the generation unit 31, in which are arranged the block length register 20, the read pointer register 18 with the assigned read pointer up/down counter 32 and the write pointer register 19 with the assigned write pointer up/down counter 33.

The information part bus 26 is in each case present at the inputs of the block length register 20, of the read pointer register 18 and of the write pointer register 19, provides the input values for the registers. The storage operation for the input values is effected by means of the set bit signal 34, which is likewise present at the inputs of the registers.

The output of the block length register 20 provides for the modulo count for the read pointer up/down counter 32 and the write pointer up/down counter 33. The start value of the read pointer 35 is provided at the output of the read pointer register 18 as an input into the read pointer up/down counter 32. The output thereof applies the present value of the read pointer 35 to the input of the read pointer register 18. As a result, the read pointer 35 is provided via the second output of the read pointer register 18.

The start value of the write pointer 36 is provided at the output of the write pointer register 19 as an input into the write pointer up/down counter 33. The output thereof applies the present value of the write pointer 36 to the input of the write pointer register 19. As a result, the write pointer 36 is provided via the second output of the write pointer register 19.

While there have been described what are believed to be the preferred embodiments of the invention those skilled in the art will recognize that other changes and modifications may be made thereto without departing from the spirit of the invention, and it is intended to claim all such changes and modifications as fall within the true scope of the invention.

The invention claimed is:

1. A method for generation of instruction words in a digital processor having an instruction word memory wherein instruction words are arranged in rows, each instruction word having a plurality of instruction word parts, each driving a functional unit of said processor, comprising:
   deriving primary instruction words from a program code;
   combining said primary instruction words into a sequence of associated program words;
   reading an instruction word from a row of said instruction word memory determined by a reading row number;
   modifying said read instruction word by substituting an instruction word part with an information part of an associated program word;
   writing said modified instruction word part to a row of said instruction word memory determined by a writing row number; and
   outputting a completed instruction word to drive said functional units of said processor,
   wherein said reading row number and said writing row number are provided by respective reading row and writing row registers, and wherein a number of sequential reading row and writing row numbers are determined by contents of a block length register.

2. A method as specified in claim 1, further providing re-setting contents of said reading row register, said writing row register and said block length register by providing a program word having a set bit, which in an active state designates information parts of said program word as containing data for re-setting said registers.

3. A method as specified in claim 2 wherein said active state of said set bit causes said information parts of said program word to be stored in said registers.

4. A method as specified in claim 1 wherein said instruction register further includes a first instruction word page and a second instruction word page having the same row numbers, wherein there is provided a page register whose contents designate one of said pages as active.

5. A method according to claim 1 wherein if an instruction word is not called for during execution of a step of said instruction word generation, an additional instruction word is formed by a prefetch unit calling a subsequent sequence of associated program words.

6. A method for the generation of instruction words in a digital processor having an instruction word memory wherein instruction words are arranged in rows, each instruction word having a plurality of instruction word parts, each driving a functional unit of said processor, comprising:
   deriving primary instruction words from a program code;
   assembling said primary instruction words into a sequence of associated program words;
   reading an instruction word from a row and page of said instruction word memory determined by a reading row number and a page number stored in a page register;
   modifying said instruction word by substituting an instruction word part with an information part of an associated program word;
   writing said modified instruction word to a row and page of said instruction word memory determined by a writing row number and a page number stored in said page register; and
   outputting a completed instruction word to control said functional units of said processor.

7. A method according to claim 6 wherein an interrupt signal during execution of a first task by said processor, wherein said instruction words are stored in a first page of said instruction word memory, causes said processor to generate instruction words using a second page of said instruction word memory for a second interrupt task, and on completion of said second interrupt task to return to said instruction words stored on said first page of said instruction word memory.

8. A method according to claim 6 wherein if an instruction word is not called during execution of a step of said instruction word generation, an additional instruction word is formed by a prefetch unit calling a subsequent sequence of associated program words.

* * * * *